Dec. 13, 1949   R. M. HOFMANN   2,491,313
GEARING
Filed Jan. 15, 1946
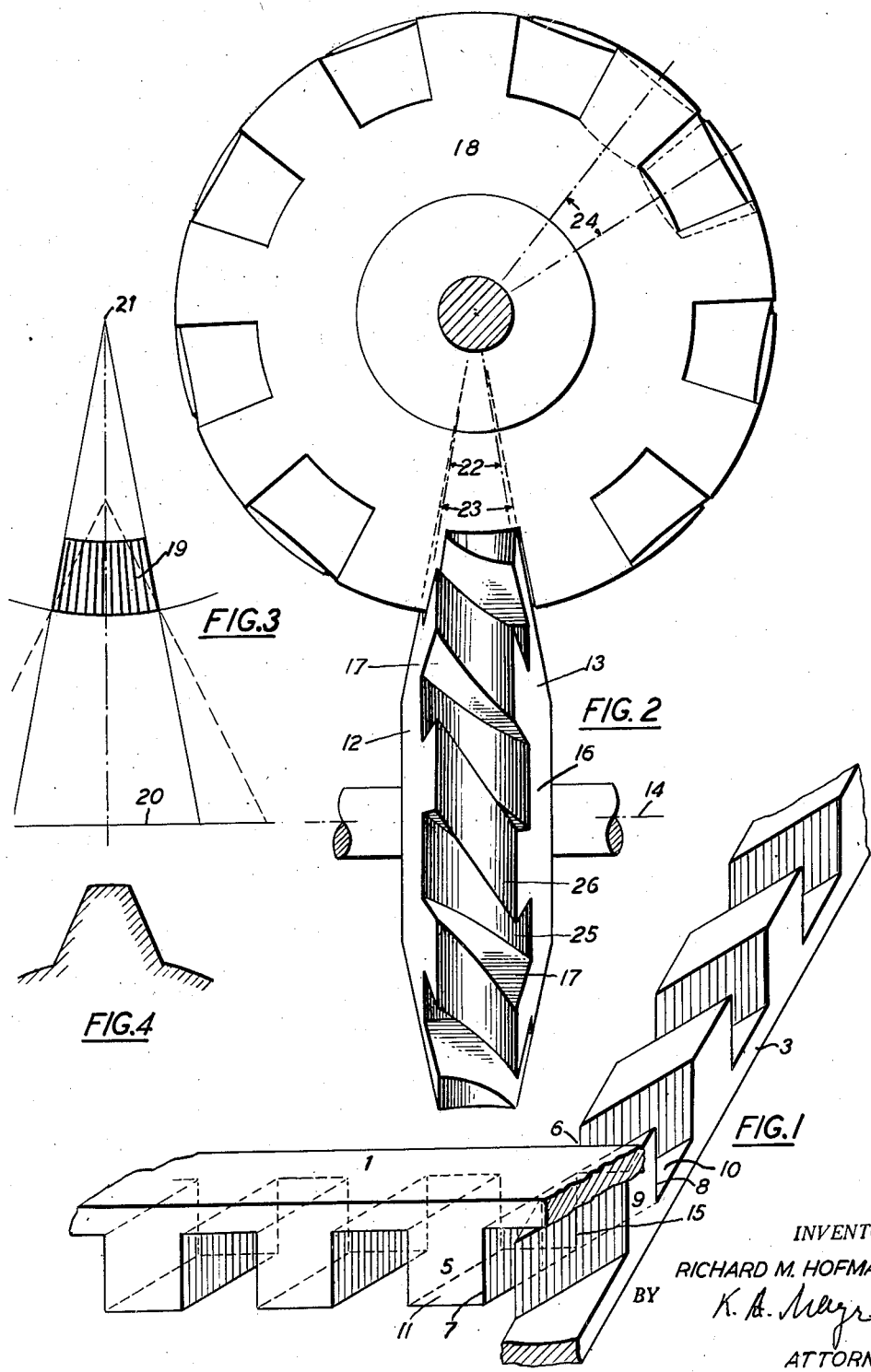
INVENTOR:
RICHARD M. HOFMANN
BY K. A. Meyer
ATTORNEY.

Patented Dec. 13, 1949

2,491,313

UNITED STATES PATENT OFFICE 2,491,313

GEARING

Richard M. Hofmann, New Hyde Park, N. Y.

Application January 15, 1946, Serial No. 641,262

23 Claims. (Cl. 74—466)

1

The present invention relates to a rotary mechanism more particularly to an improved toothed gearing which may be used for transmission of power, for the displacement, pumping and compressing of fluids and for the production of power by pressure fluids, in hydraulic motors, or by expanding media.

All gears of the toothed type and having two essential parts, driver and follower, have either point, line, or at its best, partial surface contact. It is an object of the present invention to provide a toothed gearing having practically full surface contact during the whole working cycle.

In a toothed gearing according to the invention the contact between tooth flanks truly resembles surface contact. The contact between top surface or top land of one toothed element and the bottom surface or bottom land of the mating element also represents surface contact in all practical applications of the invention. Other objects of the invention are the provision of a mechanism of the toothed gear type in which the leading tooth flank edge of one gear strikes the leading tooth flank edge of the other gear over the whole length simultaneously; the trailing tooth flank edges part likewise. These characteristics are of consequence when the invention is applied to pumping machinery.

With the new mechanism the contact between all surfaces is purely sliding contact and the contact area is increased and the pressure per unit of surface in contact is reduced.

The gear according to the invention must not be confused with the so-called Globoid spiral gearing where the teeth roll in and out of mesh though the body of the new gear is a Globoid because the surface of one body follows the circumference of the mating gear blank. With the new, finished, gear, however, the teeth slide and do not roll into engagement.

The new gear comprises helixes following around the body of its mating gear, in contradistinction to Hindly and Cone worm drives, or spiral worm gears whereby the helix of one of the gear members follows around its own axis exclusively.

Further and other objects and advantages of the invention will be apparent from the accompanying specification and claims and shown in the drawings which, by way of illustration show what I now consider to be preferred embodiments of my invention.

In the drawings:

Fig. 1 is a diagrammatic showing of two cooperating tooth racks illustrating the basic principle of the invention.

Fig. 2 illustrates a gearing according to the invention.

Fig. 3 is a diagram illustrating the tooth forming process.

2

Fig. 4 shows a tooth profile.

Referring more particularly to Fig. 1 of the drawings, this figure shows in a diagrammatic way the idea underlying the invention. If the rack 1 is moved in the direction to the right the rack 3 is moved toward the viewer. The prismoid teeth of the racks are placed at an angle to the direction of movement of the racks. The leading front flank tooth edge 15 of tooth 5 of driver 1 contacts a flank of a tooth of follower rack 3. Tooth 5 proceeds unobstructed through gash 6 and before the trailing front tooth edge 7 of driver tooth 5 has passed the trailing back tooth flank edge 8 of follower tooth 9, the leading front flank edge of the next driver tooth has made contact with the leading back tooth flank edge of the next follower tooth. The mechanism according to the invention produces one large contact area between adjacent tooth flanks and another between the bottom surface 10 and the tooth top surface 11.

If the racks are inclosed and a fluid would fill the spaces between the teeth of rack 1 this would be squeezed out of the vanishing triangular space produced upon engagement of teeth 5 and 9 and the device act as a pump. Likewise, the tooth arrangement according to the invention may be used as a motor by introducing a pressure and/or expanding fluid in said triangular space; in this case the motion of rack 1 would be in opposite direction.

If the teeth are arranged on the circumference of drums a pair of helical gears is produced. In doing so, the teeth must be modified to take care of the reduction from the infinite radius of the racks, to one of definite size, to retain all the characteristic features of the invention. The axis of one gear might take any position and angle in relation to the other gear axis, but they must never intersect. One extreme being an internal helical gear, the other an ordinary helical gear with axes at right angles and not intersecting. The ratio can vary.

A helical gear of the last mentioned type having a ratio of 1:1 is illustrated in Fig. 2 of the drawings. Both gear wheels are exactly alike. The sides 12 and 13 converge towards the periphery and if a plane were laid through the axis 14 of wheel 16 and the center of wheel 18 the lines formed by the intersection of said face sides and said plane would meet in the center of wheel 18. The theoretical face angle 22 equals the center angle 24 for an arc of half the circular pitch of the opposite gear. To obtain smooth running gears the actual face angle 23 of one or both gear members is slightly larger than the theoretical face angle 22 so one pair of teeth will not part contact until the next pair of teeth has met.

Referring to Fig. 3 of the drawings, the teeth are generated by having a surface 19 rotated about axis 20 of one gear wheel thereby cutting gashes into the blank of the other gear wheel which rotates about its own axis 21 at the proper speed. If the lines enclosing the surface 19 meet in the axis 21 a tooth configuration as shown in Fig. 2 will result. In this case there is a tooth undercut. The load transmitting capacity which is impaired by the tooth undercut, however, is restored by the existing area contact between the active tooth flanks and the increased width of the tooth root. If the lines enclosing the surface 19 intersect between the two axes of rotation, as shown in dotted lines in Fig. 3, a section taken through the center of a tooth in a plane at right angle to its axis of rotation results as per Fig. 4. Configurations as per Figs. 2 and 4 and intermediate conditions are possible with the new gear.

Referring to Fig. 2, the tooth flanks 17 including their leading and trailing edges are a generation of straight lines extending, when the flanks of a tooth of wheel 16 and of wheel 18 are in engagement, through the axes of both wheels and, upon rotation of the wheels, advancing along a helix.

The circumferential face 26 or top of the teeth is caved in, i. e. the radii forming the lateral edges of the teeth are longer than the radii extending to the central portions of the teeth top surfaces to assure area contact with the bottom surfaces 25 of the mating wheel. For the same reason bottom surfaces 25 are also caved in, i. e. the radii at the wheel faces are longer than the radii extending to the central portions of the bottom surfaces.

While I believe the above described embodiments of my invention to be preferred embodiments, I wish it to be understood that I do not desire to be limited to the exact details of design and construction shown and described, for obvious modifications will occur to a person skilled in the art.

I claim:

1. A toothed gearing comprising two mating wheels rotating about axes disposed at an angle and not intersecting, the recesses between the teeth of one wheel having a configuration as produced, geometrically, by rotating, about the axis of rotation of the mating wheel, an area having the outlines of a section through a tooth of the first wheel taken in a plane at right angle to its axis of rotation and having flank lines which are portions of the equal sides of an imaginary isosceles triangle erected over the axis of rotation of said mating wheel, and by simultaneously rotating said first wheel about its axis of rotation.

2. A toothed gearing comprising two mating wheels rotating about axes disposed at an angle and not intersecting, the recesses between the teeth of one wheel having a configuration as produced, geometrically, by rotating, about the axis of rotation of the mating wheel, an area having the outlines of a section through a tooth of the first wheel taken in a plane at right angle to its axis of rotation and having flank lines which are portions of the equal sides of an imaginary isosceles triangle erected over the axis of rotation of said mating wheel and having its equal sides intersecting at a vertex the perpendicular distance of which from said axis is larger than the radius of said mating wheel, and by simultaneously rotating said first wheel about its axis of rotation.

3. A toothed gearing comprising two mating wheels rotating about axes disposed at an angle and not intersecting, the recesses between the teeth of one wheel having a configuration as produced, geometrically, by rotating, about the axis of rotation of the mating wheel, an area having the outlines of a section through a tooth of the first wheel taken in a plane at right angle to its axis of rotation and having flank lines consisting of portions of the equal sides of an imaginary isosceles triangle erected over the axis of rotation of said mating wheel and having its equal sides intersecting in a vertex the perpendicular distance of which from said axis is larger than the radius of said mating wheel and smaller than the distance between the centers of said wheels, and by simultaneously rotating said first wheel about its axis of rotation.

4. A toothed gearing comprising two mating wheels rotating about axes disposed at an angle and not intersecting, the recesses between the teeth of one wheel having a configuration as produced, geometrically, by rotating, about the axis of rotation of the mating wheel, an area having the configuration of a section through a tooth of the first wheel taken in a plane at right angle to its axis of rotation and having flank lines consisting of portions of the equal sides of an imaginary isosceles triangle erected over the axis of rotation of said mating wheel and having its equal sides intersecting in a vertex the perpendicular distance of which from said axis is equal to the distance between the centers of said wheels, and by simultaneously rotating said first wheel about its axis of rotation.

5. A toothed gearing comprising two mating wheels rotating about axes disposed at an angle and not intersecting, the recesses between the teeth of one wheel having a configuration as produced, geometrically, by rotating, about the axis of rotation of the mating wheel, an area having the outlines of a section through a tooth of the first wheel taken in a plane at right angle to its axis of rotation and having substantially the configuration of an isosceles trapezoid with the long parallel side coinciding with the axis of rotation of said mating wheel, said area having flank lines which are portions of the equal sides of said trapezoid at its narrow end, and by simultaneously rotating said first wheel about its axis of rotation.

6. A toothed gearing comprising two mating wheels rotating about axes disposed at an angle and not intersecting, the recesses between the teeth of one wheel having a configuration as produced, geometrically, by rotating, about the axis of rotation of the mating wheel, an area having the configuration of a section through a tooth of the first wheel taken in a plane at right angle to its axis of rotation and forming the narrow end portion of an isosceles trapezoid with the long parallel side coinciding with the axis of rotation of said mating wheel and the short parallel side being a portion of a root circle of said first wheel, said area having flank lines which are equal portions of the equal sides of said trapezoid at its narrow end, and by simultaneously rotating said first wheel about its axis of rotation.

7. A toothed gearing comprising two mating wheels rotating about axes disposed at an angle and not intersecting, the recesses between the teeth of one wheel having a configuration as produced, geometrically, by rotating, about the axis of rotation of the mating wheel, an area having the outlines of a section through a tooth of the first wheel taken in a plane at right angle to its axis of rotation and having flank lines constituted of equal portions of the equal sides of an isosceles triangle erected over the axis of rotation of said mating wheel, and by simultaneously rotating said first wheel about its axis of rotation, the tooth top surfaces being curved concavely toward the center plane of their wheels and having a configuration substantially as produced, geometrically, by the intersection of a portion of the outer and largest root circle of one wheel rotating about its axis with the annular peripheral portion of the body of the mating wheel.

8. A toothed gearing comprising two mating wheels rotating about axes disposed at an angle and not intersecting, the recesses between the teeth of one wheel having a configuration as produced, geometrically, by rotating about the axis of rotation of the mating wheel, an area having the configuration of a section through a tooth of the first wheel taken in a plane at right angle to its axis of rotation and having flank lines which are equal portions of the equal sides of an isosceles triangle erected over the axis of rotation of said mating wheel, and by simultaneously rotating said first wheel about its axis of rotation, the faces of said wheels at their teeth being substantially a geometric generation of portions of the equal sides of said triangle.

9. A toothed gearing comprising two mating wheels rotating about axes disposed at an angle and not intersecting, the recesses between the teeth of one wheel having a configuration as produced, geometrically, by rotating about the axis of rotation of the mating wheel, an area having the configuration of a section through a tooth of the first wheel taken in a plane at right angle to its axis of rotation and having flank lines which are equal portions of the equal sides of an isosceles triangle erected over the axis of rotation of said mating wheel, and by simultaneously rotating said first wheel about its axis of rotation, the face of one of said wheels at its teeth being substantially a geometric generation of a portion of the equal sides of said triangle and the face of the mating wheel at its teeth being a geometric generation of a portion of the equal sides of an isosceles triangle having an angle enclosed by its equal sides larger than that enclosed by the equal sides of said first isosceles triangle.

10. A toothed gearing comprising two mating toothed wheels the axes of rotation of which are disposed at an angle and not intersecting, each wheel having teeth flank surfaces which are generated, geometrically, by lines which when said flanks engage extend radially with respect to the axes of both wheels, the engaging flank surfaces fully and slidingly contacting one another.

11. A toothed gearing comprising two mating toothed wheels the axes of rotation of which are disposed at an angle and not intersecting, each wheel having teeth flank surfaces which are generated, geometrically, by lines which when said flanks engage extend through a line connecting the centers of both wheels, the leading tooth flank edge of one wheel striking the leading tooth flank edge of the mating wheel over the whole length of said edges simultaneously and the engaging flank surfaces fully and slidingly contacting one another.

12. A toothed gearing comprising two mating toothed wheels the axes of rotation of which are disposed at an angle and not intersecting, each wheel having teeth flank surfaces which are generated, geometrically, by lines which when said flanks engage extend through a line connecting the centers of both wheels, the engaging flank surfaces substantially fully and slidingly contacting one another, and the top surfaces and mating bottom surfaces substantially fully and slidingly contacting one another.

13. A toothed gearing comprising two mating toothed wheels the axes of rotation of which are disposed at an angle and not intersecting, each wheel having teeth flank surfaces which are generated, geometrically, by lines which when said flanks engage extend radially from the axes of both wheels, the leading tooth flank edges of one wheel striking individually the leading tooth flank edges of the mating wheel and the trailing tooth flank edges of one wheel disengaging individually the trailing tooth flank edges of the mating wheel over the whole lengths of said edges simultaneously and the engaging flank surfaces fully and slidingly contacting one another.

14. A toothed gearing comprising two mating wheels rotating about axes disposed at an angle and not intersecting, the recesses between the teeth of one wheel having a configuration as produced, geometrically, by rotating about the axis or rotation of the mating wheel, an area having the configuration of a section through a tooth of the first wheel taken in a plane at right angle to its axis of rotation and having flank lines constituted of equal portions of the equal sides of an isosceles triangle erected over the axis of rotation of said mating wheel, and by simultaneously rotating said first wheel about its axis of rotation, the bottom surfaces of the recesses between the teeth being curved concavely toward the center plane of their wheels and having a configuration substantially as produced, geometrically, by the intersection of the top land of a tooth of one wheel rotating about its axis with the peripheral annular portion of the mating wheel.

15. A toothed gearing comprising two mating wheels rotating about axes disposed at an angle and not intersecting, the recesses between the teeth of one wheel having a configuration as produced, geometrically, by rotating about the axis of rotation of the mating wheel an area having the configuration of a section through a tooth of the first wheel taken in a plane at right angle to its axis of rotation and having flank lines constituted of equal portions of the equal sides of an isosceles triangle erected over the axis of rotation of said mating wheel, and by simultaneously rotating said first wheel about its axis of rotation, the faces of said wheels at their teeth having a configuration as produced, geometrically, by portions of the equal sides of isosceles triangles erected over and rotated about the respective wheel axes and having angles enclosed by their equal sides larger than that enclosed by the equal sides of said first isosceles triangle.

16. A toothed gearing comprising two mating wheels rotating about axes disposed at an angle and not intersecting, the recesses between the teeth of one wheel having a configuration as produced, geometrically, by rotating about the axis of rotation of the mating wheel an area having the configuration of a section through a tooth of the first wheel taken in a plane at right angle to its axis of rotation and having flank lines constituted of equal portions of the equal sides of an isosceles triangle erected over the axis of rotation of said mating wheel, and by simultaneously rotating said first wheel about its axis of rotation, the angle enclosed by the flanks of the teeth of one wheel in planes at right angle to the axis of rotation of said wheel being equal to one half of the pitch angle of said wheel.

17. A toothed gearing comprising two mating wheels rotating about axes disposed at an angle and not intersecting, the recesses between the teeth of one wheel having a configuration as produced, geometrically, by rotating about the axis of rotation of the mating wheel an area having the configuration of a section through a tooth of the first wheel taken in a plane at right angle to its axis of rotation and having flank lines constituted of equal portions of the equal sides of an isosceles triangle erected over the axis of rotation of said mating wheel, and by simultaneously rotating said first wheel about its axis of rotation, the angle enclosed by the flanks of the teeth of one wheel in planes at right angle to the axis of rotation of said wheel being equal to one half of the pitch angle of said wheel, and the faces of the other wheel at its teeth enclosing in planes extending through the axis of rotation of said wheel an angle which is larger than one half of the pitch angle of the other wheel.

18. A toothed gearing comprising two mating toothed wheels having axes of rotation disposed at an angle and not intersecting, the teeth of one wheel conforming substantially with the recesses in the mating wheel receiving the teeth of the first wheel, and the radial flank lines of the teeth of one wheel fully engaging the flanks of the mating wheel during the whole period of passage of said flank lines through a recess of the other wheel.

19. A toothed gearing as set forth in claim 18 in which the teeth and recesses are disposed at a slant with respect to the axis of the wheel to which they pertain.

20. A toothed gearing as set forth in claim 18 in which the lateral faces of the teeth converge in outward direction from the center of the wheel to which the teeth belong.

21. A toothed gearing as set forth in claim 20 in which said converging faces of one wheel if extended until they meet one another form a circle tangent to the axis of rotation of the other wheel.

22. A toothed gearing as set forth in claim 18 in which the width of the teeth is the same in both wheels.

23. A toothed gearing as set forth in claim 18 in which the top land surface of the teeth of both wheels is concave in its axial extension.

RICHARD M. HOFMANN.

REFERENCES CITED

The following references are of record in the file of this patent:

UNITED STATES PATENTS

| Number | Name | Date |
|---|---|---|
| 111,634 | Goodwin | Feb. 7, 1871 |
| 2,095,491 | Beare | Oct. 12, 1927 |